United States Patent [19]
Bates

[11] Patent Number: 5,468,376
[45] Date of Patent: Nov. 21, 1995

[54] PRESSURE SEALED CHAIN

[75] Inventor: Donald C. Bates, Santa Paula, Calif.

[73] Assignee: Southern California Edison, Rosemead, Calif.

[21] Appl. No.: 130,889

[22] Filed: Oct. 4, 1993

[51] Int. Cl.$^6$ ............................................. B01D 33/056
[52] U.S. Cl. .................... 210/160; 210/232; 210/400; 59/4; 198/500; 198/845; 474/209
[58] Field of Search .................... 184/6.19, 12; 59/4, 59/84; 198/500, 845, 851; 210/160, 232, 297, 400, 401; 474/209, 212

[56] References Cited

U.S. PATENT DOCUMENTS

| | | | |
|---|---|---|---|
| 2,906,562 | 9/1959 | Burgman | 305/10 |
| 3,135,128 | 6/1964 | Rudolph | 74/255 |
| 3,376,081 | 4/1968 | Deli et al. | 305/11 |
| 3,379,480 | 4/1968 | Storm | 305/11 |
| 3,787,098 | 1/1974 | Orr | 305/11 |
| 4,094,515 | 6/1978 | Araya et al. | 277/92 |
| 4,360,426 | 11/1982 | Wetzel | 210/160 |
| 4,424,050 | 1/1984 | Sato | 474/231 |
| 4,594,846 | 6/1986 | Livesay et al. | 59/5 |
| 4,729,754 | 3/1988 | Thuerman | 474/207 |
| 4,795,408 | 1/1989 | Kotegawa et al. | 474/209 |
| 5,222,920 | 6/1993 | Cheesman et al. | 474/213 |

OTHER PUBLICATIONS

Service Manual, Rex Chainbelt Inc.
Replacement Traveling Screen Chain, Norair Engineering Corp., 337 Brightseat Road, Landover Maryland 20785.

*Primary Examiner*—Peter A. Hruskoci
*Attorney, Agent, or Firm*—Steven G. Roeder; Sheldon & Mak, Inc.

[57] ABSTRACT

A sealed roller assembly (10) for hingeably connecting pairs of link plates (34) to form a chain (11), comprises a roller (12), a bushing (14) rotably mounted inside the roller (12), and a pin (16) rotably mounted inside the bushing (14). One pair of link plates (34) are mounted to the bushing (14), and another pair of link plates (34) are mounted to the pin (16). Seals are positioned between the adjoining surfaces of the roller (12) and the bushing (14) and the adjoining surfaces of the bushing (14) and the pin (16) to prevent contamination of the adjoining surfaces. Additionally, the roller assembly (10) can utilize a reservoir (28) containing a pressurized, fluid lubricant and a pressure accumulator (30) to continuously supply lubricant to the adjoining surfaces of the roller assembly (10).

47 Claims, 3 Drawing Sheets

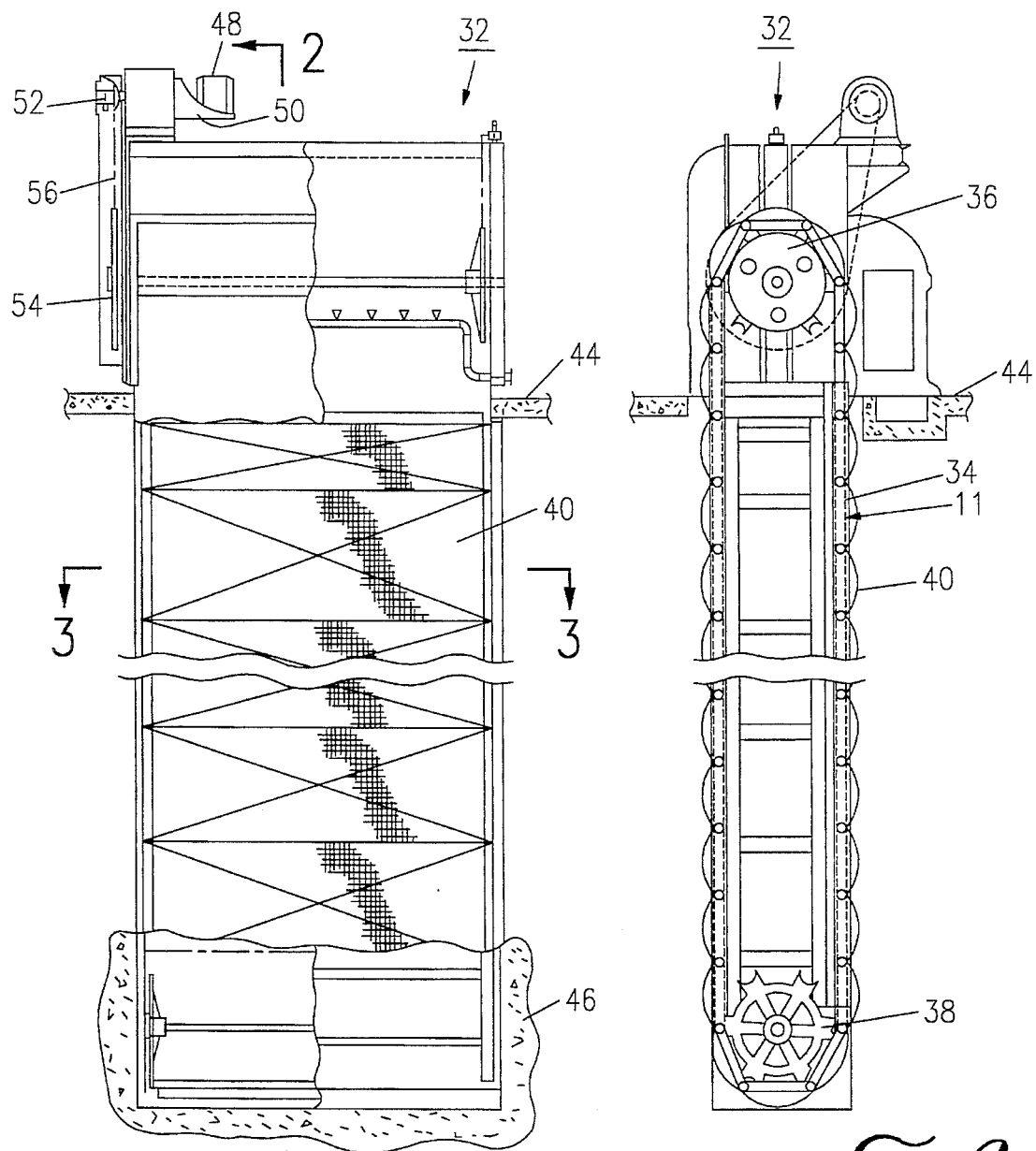
Fig. 1
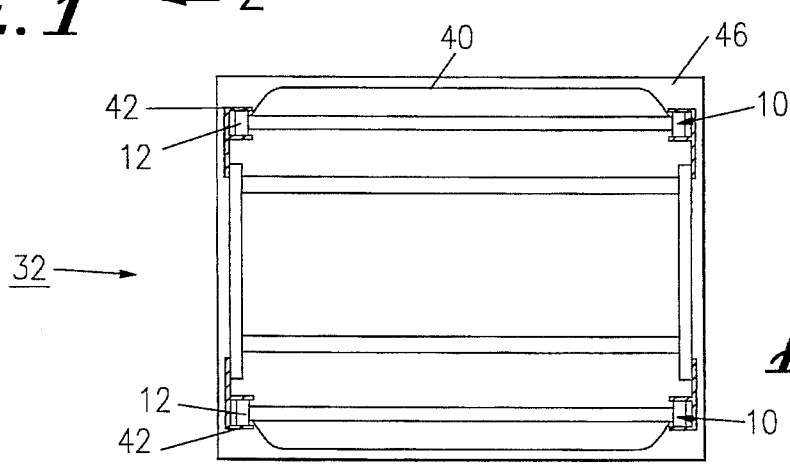
Fig. 2
Fig. 3

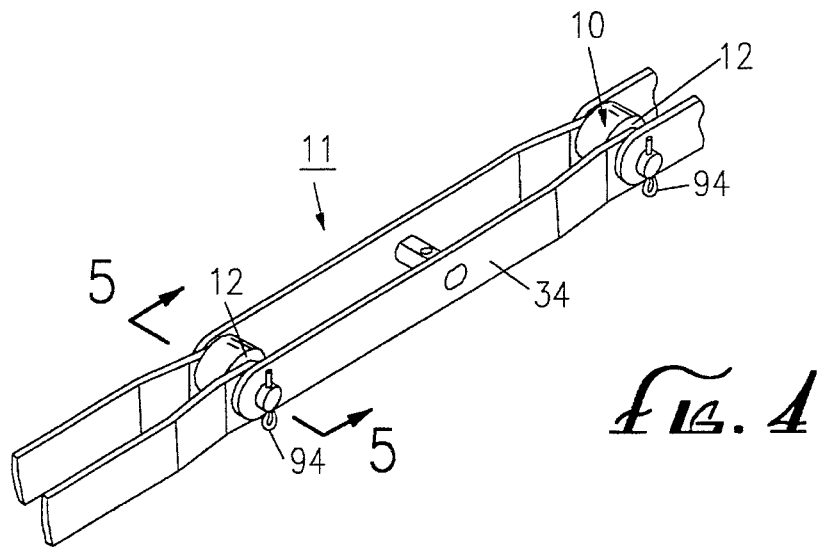
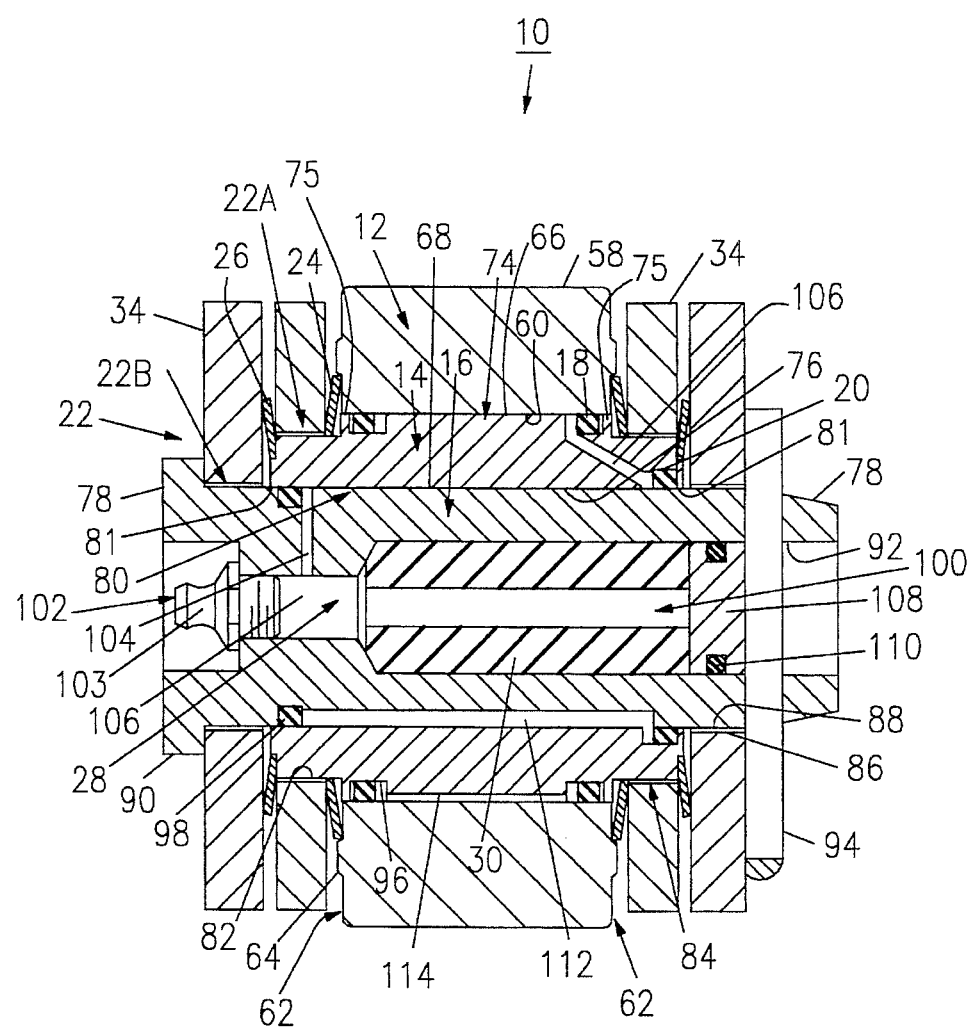

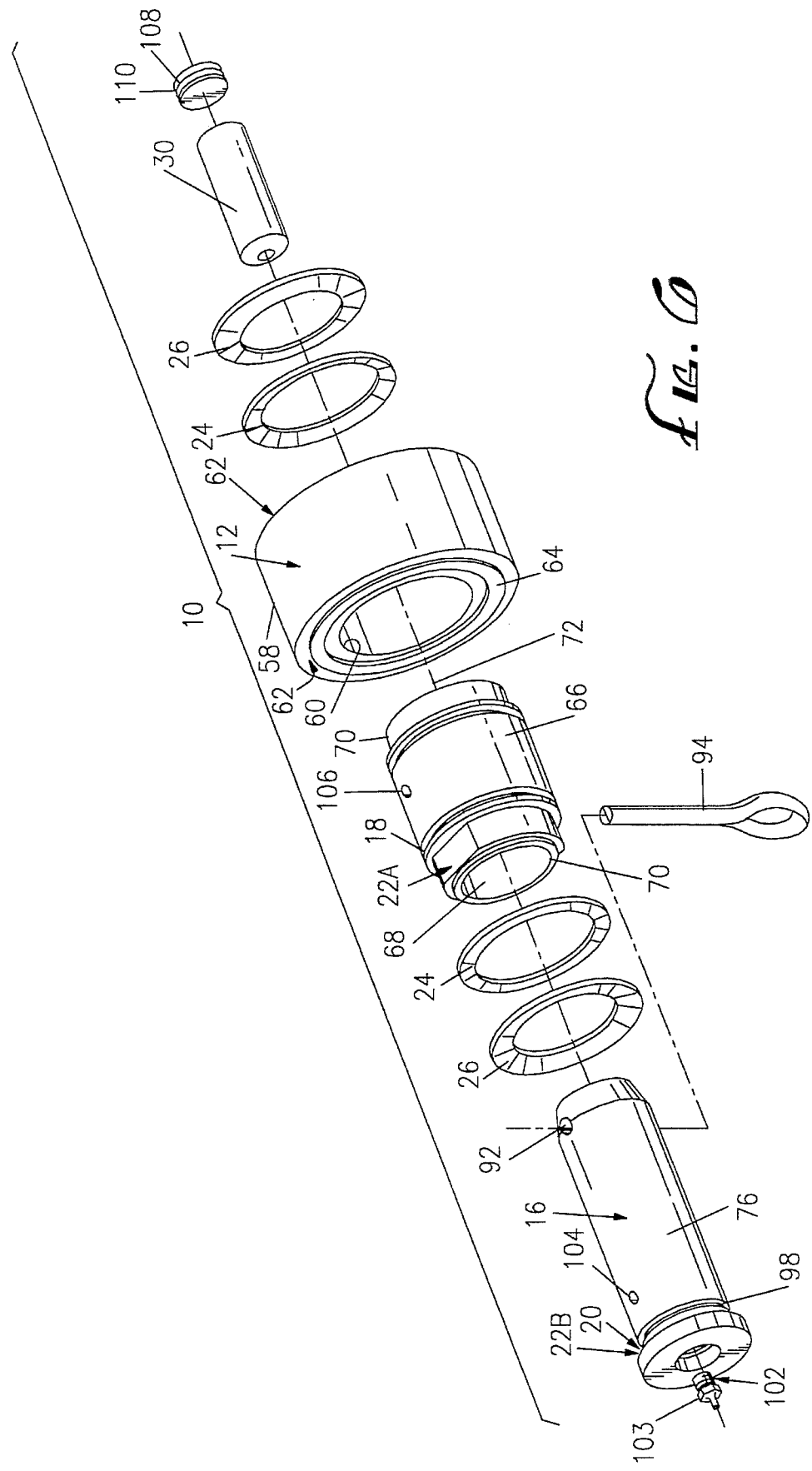

5,468,376

PRESSURE SEALED CHAIN

BACKGROUND

This invention is directed to a sealed roller assembly for connecting link plates of a chain or a roller chain.

Chains and roller chains are commonly used to transfer torque from one gear sprocket to another gear sprocket, i.e., a motorcycle chain, or in conveyor-type systems to transport objects, i.e., conveyor belts. Roller chains are particularly useful for conveyor-type systems since roller chains utilize an additional roller which rotates while slidingly contacting guides for the roller chain. For example, roller chains can be used to propel traveling screens, which are used in the cooling inlets of electrical power generating stations to catch or remove objects, i.e., fish, seaweed, plants, and debris so that these objects do not enter the cooling station equipment. Such traveling screens consist of a series of screens, attached to roller chains, moving perpendicular to the cooling water inlet of the generating station. As the cooling water passes through the traveling screens, objects are trapped in the screens and are carried out of the water as the roller chain rotates so that the traveling screens can be cleaned.

Present chains and roller chains are subject to premature wear and chain failure due largely to contaminants, i.e., dirt, dust, sand and water between the rotating adjoining surfaces of the roller assemblies of the chain and/or poor lubrication between the rotating adjoining surfaces of the roller assemblies of the chain. Further, if the chain is operating in a harsh environment, such as ocean water, contaminants—i.e., salt water, sand, sea shells, dirt—quickly invade the rotating adjoining surfaces of the roller assemblies and remove the lubricant. Contaminants and lack of lubrication leads to increased friction and rapid wear of the rotating adjoining surfaces and, ultimately, chain failure.

With traveling screens, the roller chain failure typically occurs during storms when energy demands are critical, since the storms dislodge a large volume of objects which must be filtered from the cooling inlet of the generating station and the traveling screen must be operated for extended periods of time at increased loads and/or increased rotation speeds. The roller chain failure with traveling screens can cause cooling inlets to be closed and electrical power generating stations to operate at reduced capacity.

Presently, chains with some form of sealed roller assemblies are available in the marketplace. However, these chains do not provide an adequate seal for the roller assemblies in a harsh environment. Thus, the rotating adjoining surfaces become contaminated and the lubricant leaks from between these surfaces. Further, these chains do not provide a way to continuously resupply lubricant to the adjoining surfaces of the roller assemblies. Thus, the chain must be frequently relubricated manually.

Accordingly, there is a need for a chain utilizing sealed roller assemblies which prevents the influx of contaminants into the adjoining surfaces of the roller assemblies and provides a way to continuously lubricate the roller assemblies thereby reducing chain wear and reducing chain maintenance.

SUMMARY

The present invention is directed to a roller assembly that satisfies this need, the roller assembly being useful for hingeably connecting pairs of link plates of a chain to form a sealed chain. The roller assembly of the present invention can be sold as a roller assembly, part of a chain, or as part of a traveling screen assembly.

A roller assembly having features of the present invention comprises a bushing, a pin, mounts, and at least one bushing-pin seal. The bushing is tubular, hollow and has a longitudinal axis. The pin is rotatably mounted within the bushing. Relative rotational movement occurs between the bushing and the pin. The bushing and the pin have adjoining surfaces which define an axially extending bushing-pin interface having opposed bushing-pin edges.

The mounts are used for mounting one pair of link plates to the bushing and another pair of link plates to the pin, with the longitudinal axis of the bushing transverse to the longitudinal axis of the link plates. The rotation that occurs between the bushing and the pin results in the hinged movement between the pairs of link plates of the chain.

The bushing-pin seal is positioned at the bushing-pin interface between the bushing and the pin. The bushing-pin seal is used to prevent an influx of contaminants into the bushing-pin interface. Preferably a bushing-pin seal is positioned proximate to each edge of the bushing-pin interface between the bushing and the pin to prevent the influx of contaminants into the bushing-pin interface from each bushing-pin edge. Each bushing-pin seal can be disposed in an annular groove or seat in either of the adjoining surfaces defining the bushing-pin interface.

In a second embodiment of the invention, the roller assembly is used as part of a roller chain. In this embodiment, a tubular, hollow roller is mounted over the bushing for rotational movement between the roller and the bushing. The roller and the bushing having adjoining surfaces which define an axially extending roller-bushing interface therebetween having opposed roller-bushing edges. At least one roller-bushing seal is positioned at the roller-bushing interface between the roller and the bushing for preventing the influx of contaminants into the roller-bushing interface. Preferably, a roller-bushing seal is positioned proximate to each roller-bushing edge of the roller-bushing interface to inhibit the influx of contaminants into the roller-bushing interface. Each roller-bushing seal is typically disposed in an annular groove or seat in either of the adjoining surface defining the roller-bushing interface.

In a third embodiment of the invention, the roller assembly has a reservoir for receiving a pressurized fluid lubricant for lubricating the bushing-pin interface, and a pressure accumulator (i) for reducing the volume of the reservoir as the lubricant flows out of the reservoir during use and (ii) for forcing additional lubricant out of the reservoir. This provides continuous lubrication to the adjoining surfaces of the roller assembly.

The reservoir typically comprises a cavity, a lubricant inlet valve, a pin passageway, and in embodiments with a roller, a bushing passageway. The cavity and the lubricant inlet valve can be disposed in the pin. The lubricant inlet valve can be opened to permit fluid communication between the cavity and the source of pressurized lubricant, i.e., a grease gun and closed to seal the cavity. The pin passageway extends through the roller from the cavity to the bushing-pin interface and connects the cavity and the bushing pin interface in fluid communication. Similarly, the bushing passageway extends through the bushing from the bushing-pin interface to the roller-bushing interface and connects the bushing-pin interface and the roller-bushing interface in fluid communication.

The pressure accumulator can be a section of rubber disposed in the reservoir which compresses when under pressure and expands as pressure decreases to reduce the volume of the reservoir and force lubricant out of the reservoir.

The roller assembly optimally has roller-bushing guards between each edge of the roller-bushing interface and each respective link plate for inhibiting the intrusion of large contaminants into the roller-bushing interface. The roller assembly can also optimally have bushing-pin guards disposed between each edge of the bushing-pin interface and each respective link plate for inhibiting the intrusion large contaminants into the bushing-pin interface. The roller-bushing guards and the bushing-pin guards prevent large contaminants such as stones, sand, sea shells and other sharp objects from damaging the roller-bushing seals and the bushing-pin seals.

Thus, the present invention provides a sealed roller assembly which prevents the influx of contaminants into the adjoining surfaces of the bushing-pin and roller-bushing interface and also provides a way to continuously lubricate these adjoining surfaces of the roller assembly. The reduced contamination and the continuous lubrication reduces chain wear, chain maintenance and extends the useful life of the chain.

DRAWINGS

These and other features, aspects, and advantages of the present invention will become better understood from the following description, appended claims, and accompanying drawings where:

FIG. 1 is a front plan view of a traveling screen utilizing a roller assembly embodying features of the present invention;

FIG. 2 is a longitudinal sectional view of the traveling screen of FIG. 1 taken on line 2—2 in FIG. 1;

FIG. 3 is a sectional view of the traveling screen of FIG. 1 taken on line 3—3 in FIG. 1;

FIG. 4 is a perspective view of a roller chain link utilizing a roller assembly embodying features of this present invention;

FIG. 5 is a longitudinal section view of the roller assembly taken on line 5—5 in FIG. 4; and FIG. 6 is a perspective assembly drawing of a roller assembly according to the present invention.

DESCRIPTION

The present invention is directed to a sealed roller assembly 10, having continuous lubrication for a chain 11. The roller assembly 10 comprises: (a) a roller 12; (b) a bushing 14; (c) a pin 16; (d) roller-bushing seals 18; (e) bushing-pin seals 20; (f) mounts 22; (g) roller-bushing guards 24; (h) bushing-pin guards 26; (i) a lubricant reservoir 28; and (j) a pressure accumulator 30.

The present invention can be used for any type of chain 11, i.e., a standard chain or a roller chain, which benefits from the use of seals to inhibit contamination and continuous lubrication. Further, the present invention is particularly useful for chains 11 operating in a harsh environment such as the ocean.

FIGS. 1 through 3 show a traveling screen 32 utilizing sealed roller assemblies 10 connected to pairs of link plates 34 to form two independent roller chains 11 which rotate around upper chain sprockets 36 and a lower chain sprockets 38. The screens 40 are attached to the roller chains 11 and are used to filter inlet water into an electrical power generating station (not shown). The rollers 12 of the roller chains 11 rotate in roller guides 42 which support the traveling screen 40 against the force of the water moving through the screens 40. The traveling screen 32 is supported with an upper mount 44 and a lower mount 46, i.e., concrete. A motor 48 mounted to a bracket 50 rotates an upper drive sprocket 52 which rotates a lower drive sprocket 54 with a drive chain 56. The lower drive sprocket 54 in turn rotates the upper chain sprocket 36 causing the roller chains 11 to move while rotating in the roller guide 42.

The roller 12 is tubular and hollow and has an exterior surface 58, an interior surface 60 and opposed roller sides 62. Typically, the exterior surface 58 has a circular cross section with a central axis to facilitate rotation within the roller guide 42. The size of the exterior surface 58 of the roller depends on the size of the roller guide 42, the size of the chain 11, and the loads to be carried by the chain 11. For example, for a traveling screen 32 having a 4 inch roller guide 42, the diameter of the exterior surface 58 of the roller is about 3¾ inches. Preferably, the exterior surface 58 is slightly crowned, i.e., the diameter is reduced at the opposed roller sides 62, so the force transferred from the roller guide 42 to the roller 12 is distributed equally within the roller assembly 10 to allow for uniform wear in the roller assembly 10.

Similarly, the roller's interior surface 60 has a circular cross-section with substantially the same central axis as the exterior surface 58 to facilitate rotation of the roller 12 around the bushing 14. The size of the cross-section of the interior surface 60 also depends upon the size of the roller guide 42, the size of the roller 12, the size of the chain 11, and the loads to be carried by the chain 11. For a traveling screen 32 described above, the diameter of the interior surface 60 can be about 2¼ inches.

Depending upon the type of roller-bushing guards 24 utilized, the roller 12 can have a radial ridge 64 extending from each of the opposed roller sides 62. This radial ridge 64 provides a shield for the roller-bushing guard 24 and assists in preventing large contaminants, i.e., stones, sea shells, sand, etc., from entering between the roller 12 and the respective link plate 34. Alternatively, each opposed roller side 62 could have a radial groove (not shown) to provide a shield for the roller-bushing guard 24.

Preferably the roller 12 is made of a hard, wear-resistant material to inhibit wear of the roller 12 while rotating in the roller guide 42 and over the bushing 14. High-carbon steels, grades AISI 1060 to 1095, are excellent for this task. Alternatively, other types of hard, wear-resistant steels or materials can be utilized. For example, heat treated or case hardened medium carbon steels can be used. Ultimately, the type of material used in the roller 12 will depend upon the type of material utilized for the bushing 14 and the environment in which the chain 11 operates. For example, if the chain 11 is operating in the ocean, a roller 12 made of 3-16L stainless steel or K-500 monel is preferred since these materials inhibit corrosion by the salt water.

The bushing 14 is a hollow tube having an outer surface 66, an inner surface 68, opposed bushing ends 70 and a longitudinal axis 72. The bushing 14 is mounted within the roller 12 with the adjoining surfaces of the roller 12 and the bushing 14, i.e., the bushing's outer surface 66 and roller's interior surface 60, cooperating to define a roller-bushing interface 74 having opposed roller-bushing edges 75. Typically, the bushing's outer surface 66 has a circular, cross-sectional shape which closely corresponds to that of the interior surface 60 of the roller and is rotatably disposed within the interior surface 60. Accordingly, the size and shape of the outer surface 66 depends upon the size and shape of the interior surface 60. For example, in the embodiment shown in the drawings, the outer surface 66 has a circular cross-section with a diameter of about 2¼ inches and is designed to be rotably disposed in an interior surface 60 having a circular cross-section with a diameter of about 2¼ inches.

The inner surface 66 of the bushing has a circular cross-section with substantially the same central axis as the exterior surface 58 to facilitate rotation of the roller assembly 10. The size of the inner surface 66 depends on the size of the roller guide 42 and the size of the roller assembly 10. For the roller assembly 10 shown in the drawing, the inner surface 68 has a circular cross-section with a diameter of about 1⅜ inches.

Preferably, the bushing 14 is made of a bearing material, having a wettability or affirmity for lubricants and having minute projecting irregularities for the roller 12 and the pin 16 to rotate upon. The type of material utilized for the bushing 14 depends upon the type of materials used in the roller 12 and the pin 16 and the type of environment in which the roller assembly 10 will be operating. Since the bushing 14 is attached to the link plates 34, the material utilized for the bushing also depends on the required strength of the chain 11. For example, if the roller assembly 10 is operating in ocean water, a bushing 14 made of 3-16 stainless steel or Nitronic 60 is preferred. Preferably, the bushing 14 is made of a softer material than the roller 12 and the pin 16 to facilitate rotation of the roller assembly 10. Alternatively, the roller 12 and pin 16 can be made of a softer material than the bushing 14 to facilitate rotation.

The pin 16 is tubular, having an external surface 76, and opposed pin ends 78. The pin 16 is rotatably mounted within the bushing 14 with the adjoining surfaces of the bushing 14 and pin 16, i.e., the pin's external surface 76 and the bushing's inner surface 68 cooperating to define a bushing-pin interface 80 having opposed bushing-pin edges 81. The pin's external surface 76 has a cross-sectional shape corresponding to that of the inner surface 68 of the bushing and is shaped and dimensioned to be rotatably fitted into the inner surface 68. According, the shape and dimensions of the exterior surface 76 depends upon the shape and dimensions of the inner surface 68. For example, if the cross-section of the inner surface 68 is circular, having a diameter of about 1⅜ inches, the cross-section of the pin's external surface 76 is circular, having a diameter of about 1⅜ inches.

Preferably the pin 16 is made of a hard, wear-resistant material to inhibit wear of the pin 16 while rotating against the bushing 14 and to provide a strong attachment for link plates 34. Typically, high carbon steels, grades AISI 1060 to 1095, are suitable. If the chain 11 is operating in the ocean, a pin 16 made of 3-16L stainless steel or K-500 monel is preferred since these materials are corrosion resistant.

The clearance between the interior surface 60 and the outer surface 66 and the clearance between the inner surface 68 and external surface 76 can vary according to the type of materials used to make the roller assembly 10 and the desired operational life of the chain 11. As clearances become closer, manufacturing costs and the useful life of the chain increase. Chain 11 life increases because the surfaces better conform to each other so that the load carried by the roller-bushing interface 74 and the bushing-pin interface 80 are carried over a relatively large area, thereby reducing the friction in the roller-bushing interface 74 and the bushing-pin interface 80. In most embodiments, a clearance of ±0.001–0.005 inches is allowable. However for a stainless steel roller assembly 10, a clearance of about 0.002–0.003 inches is preferred to ensure clearance for the roller assembly 10 and superior lcad distribution.

Preferably, the roller's exterior surface 58, the roller's interior surface 60, the bushing's outer surface 66, the bushing's inner surface 68, and the pin's external surface 76 have good surface finishes to reduce friction and wear in the roller assembly 10. Typically, a surface finish of between 128 to 256 microinches RMS is adequate. However, with a traveling screen 32 that utilizes stainless steel as the material for the roller assembly 10, a surface finish of 16 or less microinches RMS should be used because of the compatibility of the materials.

The mounts 22 can be any device capable of mounting one pair of link plates 34 to the bushing 14 and another pair of link plates 34 to the pin 16. The design of the mounts 22 depends upon the design of the link plates 34 and the design of the roller assembly 10. For example, the mounts 22 can be first mounts 22a for mounting one pair of link plates 34 to the bushing 14 and second mounts 22b for mounting another pair of link plates 34 to the pin 16.

As shown in the drawings, the first mounts 22a can be a bushing ledge 82 having an oval shaped cross-section disposed on one or both of the opposed bushing ends 70, and each link plate 34 can have a transverse bushing opening 84 having an oval shaped cross-section which is sized to fit onto the bushing ledge 82. The bushing openings 84 of each link plate can be slightly smaller than the bushing ledge 82 to provide an interference fit. Alternatively, the bushing openings 84 can be slightly larger than the bushing ledge 82 so that the respective link plate 34 can slide on the bushing ledge 82 to allow for transverse flexibility of the chain 11 while still preventing each link plate 34 from rotating on the bushing ledge 82. The latter embodiment is preferred so that the chain 11 can be operated while slightly misaligned. Alternatively, the bushing ledge 82 and the bushing openings 84 can have a circular cross-section.

The second mounts 22b can fixably attach a pair of link plates 34 to the pin 16. As shown in the drawing, each link plate 34 has a transverse pin opening 86 having a circular cross-section and the second mounts 22b comprising a pin ledge 88 having a circular cross-section disposed on each of the opposed pin ends 78. At least one of the pin openings 84 must be slightly smaller than the corresponding pin ledge 88 to provide an interference fit so that the pin 16 will rotate with the link plates 34. Alternatively, each pin opening 86 can have an oval or rectangular cross-section and each pin ledge 88 is sized and shaped to receive the pin opening 86. As shown in the drawings, a retainer 90, having a slightly greater cross-sectional diameter than the pin ledge 88, is disposed on one of the opposed pin ends 78 to hold the respective link plate 34 on the pin ledge 88. An aperture 92 extends through the pin 16 proximate to the other opposed pin end 78 and a cotter key 94 is inserted to hold the other respective link plate 34 on the pin ledge 88.

The roller-bushing seals 18 are positioned at the roller-bushing interface 74 between the roller 12 and the bushing 14 for preventing contamination of the roller-bushing interface 74. Similarly, the bushing-pin seals 20 are positioned at the bushing-pin interface 80 between the bushing 14 and the pin 16 for preventing contamination of the bushing-pin interface 80. The roller-bushing seals 18 and the bushing-pin seals 20 can be an O-ring type seal or other types of seals can be used. For example, a Parker, Polypack lip seal can be used because of its durability. Further, the Parker Polypack can be installed in reverse to have controlled leakage of the lubricant from roller-bushing 18 and the bushing-pin seals 20 and to prevent contaminants from entering into the roller-bushing and bushing-pin interfaces 74, 80. However, the type of seal used depends upon the size roller assembly 10, the operating environment of the roller assembly 10 and the type of lubricant utilized.

Each roller-bushing seal 18 is disposed in a roller-bushing annular groove or seat 96 proximate to each opposed roller-bushing edge 75 in either the interior surface 60 or the outer surface 66. As shown in the drawings, roller-bushing annular grooves 96 are disposed in the outer surface 66 of the bushing. However, depending upon the roller-bushing seal 18 design, the roller-bushing annular grooves 96 could be in either or both the outer surface 66 or the interior surface 60.

Similarly, depending upon the type of bushing-pin seal 20, each bushing-pin seal 20 is disposed in a bushing-pin annular groove or seat 98 proximate to each opposed bushing-pin edge 81 in either the inner surface 68 or the external surface 76. As shown in the drawings, one bushing-pin annular groove 98 is disposed in the inner surface 88 of the bushing while the other bushing-pin annular groove 98 is disposed in the external surface 76. However, the bushing-pin annular grooves 98 could be in either or both the inner surface 68 or the external surface 76.

The roller-bushing guards 24 can be any device which inhibit the intrusion of large contaminants, i.e., rocks, stones, sand, sea shells, into the roller-bushing interface 74. The roller-bushing guards 24 cover each opposed roller-bushing edge 75 and prevent large objects, from entering the roller-bushing interface 74 and damaging the roller-bushing seals 18. As shown in the drawings, each roller-bushing guard 24 is a Beleville spring over the opposed bushing end 70 and under the radial ridge 64 of the roller between each respective link plate 34 and each roller-bushing edge 75.

Similarly, the bushing-pin guards 26 inhibit the intrusion of large contaminants, i.e., rocks, stones, sand, sea shells, into the bushing-pin interface 64. The bushing-pin guards 26 cover each opposed bushing-pin edge 81 and prevent large objects from entering the bushing-pin interface 80 and damaging the bushing-pin seals 20. As shown in the drawings, each bushing-pin guard 26 is a Beleville spring mounted over the respective opposed pin end 78 positioned between each respective link plate 34 the bushing-pin edge 81.

The lubricant reservoir 28 receives a pressurized, fluid lubricant for lubricating the bushing-pin interface 80 and in some embodiments the roller-bushing interface 74. The reservoir 28 can comprise a cavity 100 in the pin 16, a lubricant inlet valve 102, a pin passageway 104, and a bushing passageway 106. Alternatively, the reservoir 28 be a cavity 100 located in the bushing 14, the roller 12, or an externally attached container to the roller assembly 10.

In the embodiment shown in the drawings, the cavity 100 is an aperture in the pin 16. The cavity 100 has an end cap 108 and an end cap seal 110 disposed near one of the opposed pen ends 78 to seal the cavity. The end cap 108 is held in position by the cotter key 94. Alternatively, the end cap 108 could be held by a weld or threaded into the pin 16.

The lubricant inlet valve 102, when open, allows for fluid communication between the cavity 100 and the source of pressurized lubricant, i.e., a grease gun (not shown) and when closed seals the cavity 100. As shown in the drawings, the lubricant inlet valve 102 can be a grease zerk 103 to facilitate the use of a grease gun.

The pin passageway 104 allows for the flow of lubricant between the cavity 100 and the bushing-pin interface 80. The pin passageway 104 extends between the cavity 100 and the bushing-pin interface 80. As shown in FIG. 5, the pin passageway 104 is a hole extending from the cavity 100 to the bushing-pin interface 80 proximate to one of the bushing-pin annular grooves 98. The pin passageway 104 can include a bushing-pin groove 112 in either or both the bushing's inner surface 68 and the pin's external surface 76. The bushing and pin groove 112 extend laterally across the bushing-pin interface 80 between the bushing-pin seals 20 and allows for lubricant distribution across the entire length of the bushing-pin interface 80.

The bushing passageway 106 connects the bushing-pin interface 80 and the roller-bushing interface 74 to permit the flow of lubricant between the cavity 100 and the roller-bushing interface 74. As shown in the drawings, the bushing passageway 106 is a hole which extends from the inner surface 68 proximate to one of the bushing-pin seals 20 to the outer surface 66 of the bushing proximate to one of the roller-bushing seals 18. Additionally, the roller-bushing interface 74 includes a roller-bushing groove 114 in either or both the roller's interior surface 60 or the bushing's outer surface 66. The roller bushing groove 114 extends laterally between the roller-bushing seals 18 to permit even distribution of the lubricant across the roller-bushing interface 74.

The size of the pin passageway 104 and the bushing passageway 106 depends on the size of the roller assembly 10 and the type of lubricant utilized. The size must be large enough to allow the lubricant to flow but small enough not to significantly diminish the strength of the bushing 14 and the pin 16. In the embodiment shown in the drawings, the pin passageway 104, and bushing passageway 106, are holes having a cross-sectional diameter of about 0.075 inches.

Preferably, the pin passageway 104, the bushing passageway 106, the roller-bushing groove 114, and bushing-pin groove 112 are positioned opposite the direction of the force applied to the chain 11 so as not to diminish the contact area at the roller-bushing interface 74 or the bushing-pin interface 80.

The pressure accumulator 30 can be any device not adversely affected by the lubricant, capable of reducing the volume of the reservoir 28 as the lubricant flows out of the reservoir 28 during use and forcing additional lubricant out of the reservoir 28. The pressure accumulator 30 can be a section of rubber, i.e., closed celled neoprene, which is resistent to oils, sized to fit within the cavity 100. As a pressurized lubricant is inserted into the cavity 100, the rubber compresses, thereby increasing the volume of the reservoir 28 which can hold the pressurized lubricant. As lubricant is lost from the roller assembly 10, the pressure of the pressurized lubricant decreases, thereby allowing the pressure accumulator 30, i.e., the rubber to expand. The expanding rubber reduces the volume of the reservoir 28 and forces the lubricant out of the reservoir 28. Alternately, the pressure accumulator 30 can be a sliding cylinder with a spring that compresses and expands.

In operation, a pressurized, fluid lubricant is inserted through the lubricant inlet valve 102, into the cavity 100 and flows from the cavity 100 through the pin passageway 104 into the bushing-pin interface 80 and through the bushing passageway 106 into the roller-bushing interface 75. Lubricant is inserted into the cavity 100 until the pressure accumulator 30, i.e., the rubber becomes compressed.

The roller-bushing seals 18 prevent the intrusion of contaminants into the roller-bushing interface 74 and maintain lubricant in roller-bushing interface 74. Similarly, the bushing-pin seals 20 prevent the intrusion of contaminants into the bushing-pin interface 80 and maintain lubricant in the roller-bushing interface 80. Further, roller-bushing guards 24 prevent large contaminants from entering the roller-bushing interface 74 and damaging the roller-bushing seals 20. Similarly, bushing-pin guards 26 prevent large contaminants from entering the bushing-pin interface 80 and damaging the bushing-pin seals 20.

Lubricant which leaks from the roller assembly 10 is replaced with lubricant which is forced form the cavity 100 by the pressure accumulator 30, i.e., the neoprene expanding. The lubricant forced from the cavity 100 flows through the pin passageway 104 to supply lubricant to the bushing-pin interface 80 and through the bushing passageway 106 to supply lubricant to the roller-bushing interface 74.

Accordingly, the roller assembly of the present invention provides an uncontaminated and constantly relubricated roller bushing interface 74 and bushing-pin interface 80 thereby reducing wear of the roller assembly 10 and increasing chain life.

Although the present invention has been described in considerable detail with reference to certain preferred versions, many other versions should be apparent to those skilled in the art. For example, the pressure accumulator 30 can be a rubber bladder filled with air or some other gas which is inserted into the lubricant reservoir 28. Therefore, the spirit and scope of the appended claims should not necessarily be limited to the description of the preferred versions contained therein.

What is claimed is:

1. An assembly for hingeably connecting pairs of link plates of a chain, each link plate having a longitudinal axis, the assembly comprising:
   (a) a tubular, hollow bushing having a longitudinal axis;
   (b) a pin rotatably mounted within the bushing for relative rotational movement between the bushing and the pin, the bushing and the pin having axially extending adjoining surfaces which define (i) an axially extending bushing-pin interface therebetween and (ii) opposed bushing-pin edges;
   (c) mounts for mounting one pair of the link plates to the bushing and another pair of link plates to the pin, with the bushing longitudinal axis transverse to the longitudinal axis of the link plates, relative rotational movement between the bushing and the pin resulting in hinged movement between the two pairs of link plates; and
   (d) at least one bushing-pin seal positioned in the bushing-pin interface between the opposed bushing-pin edges for preventing an influx of contaminants into the bushing-pin interface.

2. The assembly of claim 1 comprising of at least two bushing-pin seals, wherein one bushing-pin seal is positioned proximate to each opposed bushing-pin edge.

3. The assembly of claim 1 wherein each bushing-pin seal is disposed in a bushing-pin annular groove in either of the adjoining surfaces defining the bushing-pin interface.

4. A chain comprising at least two pairs of link plates hingeably connected by the assembly of claim 1.

5. The assembly of claim 1 further comprising:
   (a) a reservoir for receiving a pressurized, fluid, lubricant for lubricating the bushing-pin interface; and
   (b) a pressure accumulator for reducing the volume of the reservoir as the lubricant flows out of the reservoir during use and forcing additional lubricant out of the reservoir.

6. The assembly of claim 5 wherein the reservoir comprises:
   (a) a cavity disposed within the pin;
   (b) a lubricant inlet valve disposed in the pin which can be opened to permit fluid communication between the cavity and a source of pressurized lubricant and closed to seal the cavity; and
   (c) a pin passageway extending from the cavity to the bushing-pin interface and connecting the cavity and the bushing-pin interface in fluid communication.

7. The assembly of claim 5 wherein the pressure accumulator is a section of rubber disposed in the reservoir.

8. The assembly of claim 1 further comprising a tubular, hollow roller mounted over the bushing for relative rotational movement between the roller and the bushing, the roller and bushing having adjoining surfaces which define (i) an axially extending roller-bushing interface therebetween and (ii) opposed roller-bushing edges.

9. The assembly of claim 8 further comprising at least one roller-bushing seal positioned in the roller-bushing interface between the opposed roller-bushing edges for preventing an influx of contaminants into the roller-bushing interface.

10. The assembly of claim 9 further comprising:
    (a) roller-bushing guards disposed between the opposed roller-bushing edges and each respective link plate for inhibiting the influx of contaminants into the roller-bushing interface; and
    (b) bushing-pin guards disposed between the opposed bushing-pin edges and each respective link plate for inhibiting the influx of contaminants into the bushing-pin interface.

11. The assembly of claim 9 wherein each roller-bushing seal is disposed in a roller-bushing annular groove in either of the adjoining surfaces defining the roller-bushing interface and each bushing-pin seal is disposed in an annular bushing-pin groove in either of the adjoining surfaces defining the bushing-pin interface.

12. The assembly of claim 9 further comprising:
    (a) a reservoir for receiving a pressurized, fluid, lubricant for lubricating the roller-bushing interface and bushing-pin interface; and
    (b) a pressure accumulator for reducing the volume of the reservoir as the lubricant flows out of the reservoir during use and forcing additional lubricant out of the reservoir.

13. The assembly of claim 12 wherein reservoir comprises:
    (a) a cavity disposed within the pin;
    (b) a lubricant inlet valve disposed in the pin which can be opened to permit fluid communication between the cavity and a source of pressurized lubricant and closed to seal the cavity;
    (c) a pin passageway extending from the cavity to the bushing-pin interface and connecting the cavity and the bushing-pin interface in fluid communication; and
    (d) a bushing passageway extending from the bushing-pin interface to the roller-bushing interface and connecting the bushing-pin interface and the roller-bushing interface in fluid communication.

14. A chain comprising at least two pairs of link plates hingeably connected by the assembly of claim 9.

15. A traveling screen comprising:
    (a) an upper chain sprocket;
    (b) a lower chain sprocket;
    (c) the chain of claim 14 positioned on the upper and lower chain sprockets; and (d) at least one screen attached to the chain.

16. An assembly for hingeably connecting pairs of link plates of a chain, each link plate having a longitudinal axis, the assembly comprising:

(a) a tubular, hollow bushing having a longitudinal axis;

(b) a pin rotatably mounted within the bushing for relative rotational movement between the bushing and the pin, the bushing and pin having axially extending adjoining surfaces which define (i) an axially extending bushing-pin interface therebetween and (ii) opposed bushing-pin edges;

(c) mounts for mounting one pair of the link plates to the bushing and another pair of link plates to the pin, with the bushing longitudinal axis transverse to the longitudinal axis of the link plates, relative rotational movement between the bushing and the pin resulting in hinged movement between the two pairs of link plates;

(d) a reservoir for receiving a pressurized, fluid, lubricant for lubricating the bushing-pin interface; and (e) a pressure accumulator for reducing the volume of the reservoir as the lubricant flows out of the reservoir during use and forcing additional lubricant out of the reservoir.

17. A chain comprising at least two pairs of link plates hingeably connected by the assembly of claim 16.

18. The assembly of claim 16 further comprising at least one bushing-pin seal positioned in the bushing-pin interface between the opposed bushing-pin edges for preventing the influx of contaminants into the bushing-pin interface.

19. The assembly of claim 18 further comprising of at least two bushing-pin seals, wherein one bushing-pin seal is positioned proximate to each opposed bushing-pin edge.

20. The assembly of claim 16 wherein the reservoir comprises:

(a) a cavity disposed within the pin;

(b) a lubricant inlet valve disposed in one end of the pin which can be opened to permit fluid communication between the cavity and a source of pressurized lubricant and closed to maintain the pressure of the lubricant in the cavity; and (c) a pin passageway extending from the cavity to the bushing-pin interface and connecting the cavity and the bushing-pin interface in fluid communication.

21. The assembly of claim 20 wherein the pressure accumulator is a section of rubber disposed in the reservoir.

22. The assembly of claim 16 further comprising a tubular, hollow roller mounted over the bushing for relative rotational movement between the roller and the bushing, the roller and bushing having axially extending adjoining surfaces which define (i) an axially extending roller-bushing interface therebetween and (ii) opposed roller-bushing edges.

23. The assembly of claim 22 further comprising:

(a) at least one roller-bushing seal positioned in the roller-bushing interface between the opposed roller-bushing edges for preventing the influx of contaminants into the roller-bushing interface; and (b) at least one bushing-pin seal positioned in the bushing-pin interface between the opposed bushing pin edges for preventing the influx of contaminants into the bushing-pin interface.

24. A chain comprising at least two pairs of link plates hingeably connected by the assembly of claim 23.

25. The assembly of claim 23 wherein reservoir comprises:

(a) a cavity disposed within the pin;

(b) a lubricant inlet valve disposed in one end of the pin which can be opened to permit fluid communication between the cavity and a source of pressurized lubricant and closed to maintain the pressure of the lubricant in the cavity;

(c) a pin passageway extending from the cavity to the bushing-pin interface and connecting the cavity and the bushing-pin interface in fluid communication; and (d) a bushing passageway extending from the bushing-pin interface to the roller-bushing interface and connecting the bushing-pin interface and the roller-bushing interface in fluid communication.

26. A roller assembly for hingeably connecting pairs of link plates of a chain, each link plate having a longitudinal axis, the roller assembly comprising:

(a) a tubular, hollow roller;

(b) a tubular, hollow bushing having a longitudinal axis rotatably mounted within the roller for relative rotational movement between the roller and the bushing, the roller and bushing having axially extending adjoining surfaces which define (i) an axially extending roller-bushing interface therebetween and (ii) opposed roller-bushing edges;

(c) a pin rotatably mounted within the bushing for relative rotational movement between the bushing and the pin, the bushing and the pin having axially extending adjoining surfaces which define (i) an axially extending bushing-pin interface therebetween and (ii) opposed bushing-pin edges;

(d) mounts for mounting one pair of the link plates to the bushing and another pair of link plates to the pin, with the bushing longitudinal axis transverse to the longitudinal axis of the link plates, relative rotational movement between the bushing and the pin resulting in hinged movement between the two pairs of link plates;

(e) at least one roller-bushing seal positioned in the roller-bushing interface between the opposed roller-bushing edges for preventing the influx of contaminants into the roller-bushing interface;

(f) at least one bushing-pin seal positioned at the bushing-pin interface between the opposed bushing-pin edges for preventing the influx of contaminants into the bushing-pin interface;

(g) a reservoir for receiving a pressurized, fluid, lubricant for lubricating the bushing-pin interface; and (h) a pressure accumulator for reducing the volume of the reservoir as the lubricant flows out of the reservoir during use and forcing additional lubricant out of the reservoir.

27. A roller chain comprising at least two pairs of link plates hingeably connected by the roller assembly of claim 26.

28. A traveling screen comprising:

(a) an upper chain sprocket;

(b) a lower chain sprocket;

(c) the chain of claim 27 positioned on the upper and lower chain sprockets; and (d) at least one screen attached to the chain.

29. The roller assembly of claim 26 further comprising at least two roller-bushing seals and at least two bushing-pin seals, wherein one roller-bushing seal is positioned proximate to each opposed roller-bushing edge and one bushing-pin seal is positioned proximate to each opposed bushing-pin edge.

30. The roller assembly of claim 29 wherein each roller-bushing seal is disposed in an annular groove in either of the surfaces defining the roller-bushing interface and each bushing-pin seal is disposed in an annular groove in either of the surfaces defining the bushing-pin interface.

31. The roller assembly of claim 26 wherein the reservoir comprises:

(a) a cavity disposed within the pin;

(b) a lubricant inlet valve disposed in one end of the pin which can be opened to permit fluid communication between the cavity and a source of pressurized lubricant and closed to maintain the pressure of the lubricant in the cavity;

(c) a pin passageway extending radially from the cavity to the bushing-pin interface and connecting the cavity and the bushing-pin interface in fluid communication; and (d) a bushing passageway extending radially from the bushing-pin interface to the roller-bushing interface and connecting the bushing-pin interface and the roller-bushing interface in fluid communication.

32. The roller assembly of claim 31 wherein the pressure accumulator is a section of rubber disposed in the cavity.

33. The roller assembly of claim 26 further comprising:

(a) roller-bushing guards disposed between the opposed roller-bushing edges and each respective link plate for inhibiting the influx of contaminants into the roller-bushing interface; and (b) bushing-pin guards disposed between the opposed bushing-pin edges and each respective link plate for inhibiting the influx of contaminants into the bushing-pin interface.

34. A roller assembly for hingeably connecting pairs of link plates of a chain, each link plate having a longitudinal axis, the roller assembly comprising:

(a) a tubular, hollow roller;

(b) a tubular, hollow bushing having a longitudinal axis rotatably mounted within the roller for relative rotational movement between the roller and the bushing, the roller and bushing having axially extending adjoining surfaces which define (i) an axially extending roller-bushing interface therebetween and (ii) opposed roller-bushing edges;

(c) a pin rotatably mounted within the bushing for relative rotational movement between the bushing and the pin, the bushing and the pin having axially extending adjoining surfaces which define (i) an axially extending bushing-pin interface therebetween and (ii) opposed bushing-pin edges;

(d) mounts for mounting one pair of the link plates to the bushing and another pair of link plates to the pin, with the bushing longitudinal axis transverse to the longitudinal axis of the link plates, relative rotational movement between the bushing and the pin resulting in hinged movement between the two pairs of link plates; and (e) at least one roller-bushing seal positioned in the roller-bushing interface between the opposed roller-bushing edges for preventing an influx of contaminants into the roller-bushing interface.

35. The roller assembly of claim 34 comprising of at least two roller-bushing seals, wherein one roller-bushing seal is positioned proximate to each opposed roller-bushing edge.

36. The roller assembly of claim 34 further comprising at least one bushing-pin seal positioned in the bushing-pin interface between the opposed bushing-pin edges for preventing the influx of contaminants into the bushing-pin interface.

37. The roller assembly of claim 36 further comprising of at least two bushing-pin seals wherein one bushing-pin seal is positioned proximate to each opposed bushing-pin edge.

38. The roller assembly of claim 34 further comprising:

(a) a reservoir for receiving a pressurized, fluid, lubricant for lubricating the roller-bushing interface; and (b) a pressure accumulator for reducing the volume of the reservoir as the lubricant flows out of the reservoir during use and forcing additional lubricant out of the reservoir.

39. The roller assembly of claim 38 wherein the reservoir comprises:

(a) a cavity disposed within the pin;

(b) a lubricant inlet valve disposed in the pin which can be opened to permit fluid communication between the cavity and a source of pressurized lubricant and closed to seal the cavity; and (c) a pin passageway extending from the cavity to the bushing-pin interface and connecting the cavity and the bushing-pin interface in fluid communication.

40. The roller assembly of claim 34 further comprising:

(a) roller-bushing guards disposed between the opposed roller-bushing edges and each respective link plate for inhibiting the influx of contaminants into the roller-bushing interface; and (b) bushing-pin guards disposed between the opposed bushing-pin edges and each respective link plate for inhibiting the influx of contaminants into the bushing-pin interface.

41. The roller assembly of claim 36 wherein each roller-bushing seal is disposed in a roller-bushing annular groove in either of the adjoining surfaces defining the roller-bushing interface and each bushing-pin seal is disposed in an annular bushing-pin groove in either of the adjoining surfaces defining the bushing-pin interface.

42. A chain comprising at least two pairs of link plates hingeably connected by the roller assembly of claim 34.

43. A traveling screen comprising:

(a) an upper chain sprocket;

(b) a lower chain sprocket;

(c) the chain of claim 42 positioned on the upper and lower chain sprockets; and (d) at least one screen attached to the chain.

44. A roller assembly for hingeably connecting pairs of link plates of a chain, each link plate having a longitudinal axis, the roller assembly comprising:

(a) a tubular, hollow roller;

(b) a tubular, hollow bushing having a longitudinal axis rotatably mounted within the roller for relative rotational movement between the roller and bushing, the roller and bushing having axially extending adjoining surfaces which define (i) an axially extending roller-bushing interface therebetween and (ii) opposed roller-bushing edges;

(c) a pin rotatably mounted within the bushing for relative rotational movement between the bushing and the pin, the bushing and pin having axially extending adjoining surfaces which define (i) an axially extending bushing-pin interface therebetween and (ii) opposed bushing-pin edges;

(d) mounts for mounting one pair of the link plates to the bushing and another pair of link plates to the pin, with the bushing longitudinal axis transverse to the longitudinal axis of the link plates, relative rotational movement between the bushing and the pin resulting in hinged movement between the two pairs of link plates;

(e) a reservoir for receiving a pressurized, fluid, lubricant for lubricating the roller-bushing interface; and (f) a pressure accumulator for reducing the volume of the reservoir as the lubricant flows out of the reservoir during use and forcing additional lubricant out of the reservoir.

45. The roller assembly of claim 44 wherein the reservoir comprises:

(a) a cavity disposed within the pin;

(b) a lubricant inlet valve disposed in one end of the pin which can be opened to permit fluid communication between the cavity and a source of pressurized lubricant and closed to maintain the pressure of the lubricant in the cavity; and (c) a pin passageway extending from the cavity to the bushing-pin interface and connecting the cavity and the bushing-pin interface in fluid communication.

46. A chain comprising at least two pairs of link plates hingeably connected by the roller assembly of claim 44.

47. A traveling screen comprising:

(a) an upper chain sprocket;

(b) a lower chain sprocket;

(c) the chain of claim 46 positioned on the upper and lower chain sprockets; and (d) at least one screen attached to the chain.

* * * * *